United States Patent [19]
Garren

[11] 3,768,299
[45] Oct. 30, 1973

[54] AUTOMATIC TEST VALVE FOR TESTING PRESSURE RELIEF VALVES

[75] Inventor: Leeroy L. Garren, Pampa, Tex.

[73] Assignee: Lee-Tex Valve, Inc., Pampa, Tex.

[22] Filed: June 26, 1972

[21] Appl. No.: 266,495

[52] U.S. Cl................................ 73/4 R, 137/512.3
[51] Int. Cl............................................ F16k 17/00
[58] Field of Search................ 73/4, 37; 137/512.3, 137/614.2, 614.21

[56] References Cited
UNITED STATES PATENTS
2,178,901  11/1939  Webster................................ 73/4 R
3,049,148  8/1962  Richardson........................... 73/4 R

*Primary Examiner*—Donald O. Woodiel
*Attorney*—William E. Schuyler, Jr. et al.

[57] ABSTRACT

An automatic test valve for testing a pressure relief valve adapted to be positioned between an inlet flange of the relief valve and a companion flange of a pressure system. The valve includes a cylindrical body defining a chamber and having a base member with an orifice therein. A spring biased pivotal clapper valve member normally closes the orifice. The orifice is larger than the orifice of the pressure relief valve being tested. The body is provided with an inlet opening leading into the chamber and a discharge opening leading from the chamber to permit pressurized test fluid to be introduced into the chamber and to permit fluid to be discharged therefrom so that the chamber may be purged without removing the valve from the pressure system. To test a pressure relief valve, the test valve is mounted between the relief valve inlet flange and a companion flange of the pressure system and a fluid is then introduced under pressure on the pressure relief valve side of the test valve and the pressure increased on that side to at least the pressure at which the relief valve is set to open. The test valve may also be purged by passing pressurized fluid therethrough at a pressure lower than the pressure relief valve opening pressure.

13 Claims, 3 Drawing Figures

PATENTED OCT 30 1973 3,768,299

AUTOMATIC TEST VALVE FOR TESTING PRESSURE RELIEF VALVES

BACKGROUND OF THE INVENTION

1. Field of the Invention

This invention relates generally to test valves and more particularly to an automatic clapper test valve which is adapted to be mounted between the inlet flange of the pressure relief valve and a companion flange of a pressure system.

2. Description of the Prior Art

Pressure relief valves are in wide use in pressure systems and are designed to open at a predetermined pressure set by an operator. After a pressure relief valve has been set to open at a predetermined pressure and has been installed and used in a pressure system for a period of time, it is desirable to check the valve to see whether or not it will open at the predetermined pressure. Often after the valves have been in use for a period of time, they fail to open at the predetermined pressure for a variety of reasons. For example, the elements of the valves often deteriorate, causing the valves to malfunction. It is therefore desirable to periodically check the pressure relief valves to insure that they are functioning properly and will release at the previously determined pressure which has been set by the operator.

Previously known prior art methods and apparatus for testing pressure relief valves have suffered from many disadvantages. Certain of such prior art devices employ a plug valve which must be manually operated to close off the pressure from the pressure system in order to test the pressure relief valve. The plug valve not only places an automatic resistance in the line, but if it is accidentally left closed following a test, then the relief valve is inoperable. Another testing device for pressure relief valves incorporates a testing device right into the main body of the pressure relief valve. Such a device is shown, for example, in Webster U.S. Pat. No. 2,178,901. With the device shown in the Webster patent, however, it is necessary to buy a whole new unit, including both the test valve and a pressure relief valve. With this type of unit, it is not possible to continue to utilize previously obtained pressure relief valves. Another prior art device employs a rupture disc between the pressure system and the pressure relief valve, as shown in Myers U.S. Pat. No. 3,485,082. This type of device is disadvantageous in that once the disc ruptures it may not be reused. It is thus necessary to put in a whole new disc.

SUMMARY OF THE INVENTION

Among the objects of the present invention is to avoid the disadvantages of prior art methods and apparatus for testing pressure relief valves enumerated above. Another object of the present invention is to provide an automatic test valve for testing a pressure relief valve which may be mounted as a separate unit between the inlet flange of the pressure relief valve and a companion flange of the pressure system. A further object is to provide such a test valve which opens and closes automatically in response to variations in pressure in the pressure system. A still further object is to provide such a test valve having an inlet opening for admitting test fluid under pressure and a discharge opening whereby the chamber of the test valve may be purged of any corrosive fluids. Another object of the invention is to provide such a test valve which functions efficiently without placing any undue resistance in the line of the pressure system. Still another object of the invention is to provide such a test valve which is simple in construction.

According to the present invention, there is provided an automatic test valve for testing a pressure relief valve which is adapted to be mounted between the pressure relief valve inlet flange and a companion pipe flange of a pressure system. The test valve comprises a body defining a chamber and having a base member therein which defines an orifice. A spring biased pivotally mounted clapper valve member normally closes the orifice and is adapted to automatically open and close in response to variations in pressure in the pressure system. An inlet opening or port is provided in the body leading into the chamber to permit fluid under pressure to be introduced into the chamber. Moreover, a discharge opening is also provided in the body leading from the chamber to permit fluid to be discharged therefrom, whereby the chamber may be purged without removing the valve from the pressure system. The orifice of the test valve is preferably from 10 to 20 percent larger than the orifice of the pressure relief valve to be tested.

According to the present invention, there is also provided a method of testing pressure relief valves adapted to open at a predetermined pressure wherein a test valve according to the present invention is mounted as a separate member on the inlet side of the pressure relief valve between the pressure relief valve inlet flange and a companion flange of the pressure system in fluid tight relation. Fluid is then introduced under pressure on the pressure relief side of the valve and the pressure increased on the side to at least the predetermined opening pressure of the pressure relief valve to test the valve to see whether it will open at the predetermined pressure. Moreover, the inside of the test valve may be purged by introducing a cleansing fluid at a pressure less than that required to open the pressure relief valve through the inlet opening into the chamber of the test valve and then discharging the fluid through the discharge opening leading from the chamber of the valve.

BRIEF DESCRIPTION OF THE DRAWINGS

Other objects and advantages of the invention will become apparent by reference to the more detailed description of the invention and the accompanying drawings which follow wherein.

DESCRIPTION OF THE INVENTION

Figure 1:
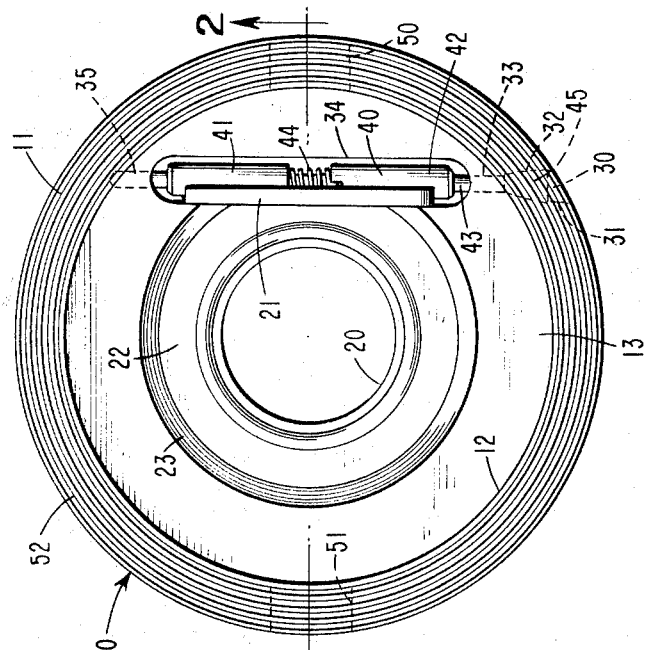
FIG. 1 is a top plan view of a test valve according to the present invention showing the clapper valve member in an open position.

Referring to the drawings, there is shown an automatic test valve 10 according to the present invention, adapted to test pressure relief valves while the relief valves are connected to the pressure system without the opening of the relief valve causing any upset in the main line beneath the automatic test valve. The test valve 10 comprises a valve body 11 which is cylindrical in configuration as best shown in FIG. 1 and whose walls define a cylindrical chamber 12 within the valve body. The valve body further includes a base member 13 which closes off and forms the bottom of the chamber 12. The base member 13 is rigidly secured to the bottom of the walls of the valve body by suitable means including dowel pins 14. Preferably the valve body 11 is constructed of stainless steel.

Figure 2:
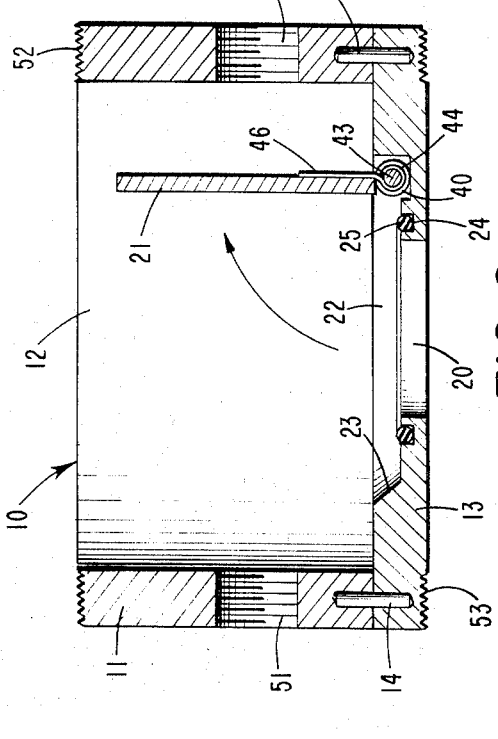
FIG. 2 is a cross-sectional elevational view taken along line 2—2 of FIG. 2.

The base member 13 is provided with a central orifice 20 which is normally closed by a spring loaded clapper valve member 21 pivotally attached at one end to the base member 13. The top surface of base member 13 surrounding the top of orifice 20 is machined and cut to form a recessed area or portion 22 surrounding the orifice. As shown in FIG. 2, the peripheral edge of recessed area 22 is beveled so as to form a side wall slanting downwardly and inwardly from the top of base member 13 as indicated by the numeral 23. The area at the bottom of recessed portion 22 immediately surrounding the orifice 20 is further machined to form a circular groove 24 surrounding the orifice to receive sealing means such as O-ring 25.

An elongated opening or slot 30 extends inwardly from the edge of the base member 24 to house the means for pivotally connecting the clapper valve member 21 to base member 13. The elongated slot 30 has a first portion 31 extending inwardly from the edge of the base member, a second portion 32 which slants inwardly to form a portion of gradually decreasing diameter leading into a third portion 33 of constant diameter. Portions 31, 32 and 33 are all beneath the surface of base member 13. Following portion 33, the slot 30 is widened as at 34 for a substantial distance during which it is open at the top of base member 13 to permit the clapper valve member 21 to operate to open and close the orifice 20. Following portion 34 the slot 30 is again reduced to a straight cylindrical portion 35.

A pivot pin housing 40 is attached to one edge of the clapper valve member 21 and is comprised of a first part 41 and a second part 42 with a space in between to accommodate a torsion or helically coiled spring 44. After the housing 40 and the spring 44 have been positioned in the portion 34 of slot 30, a pivot pin 43 is inserted through the end opening portion 31 of slot 30 and extended all the way through to the other end portion 35 to form a pivotal connection with the housing 40 and the spring means 44 for the clapper valve member 21. Following insertion of pivot pin 44, a suitable pressure plug 45 is inserted through portion 31 of slot 30 and received in portion 32 to form a seal at the outer end of the slot.

The spring 44 has one end 46 attached to clapper valve member 21 and its opposite end fixed with respect to the clapper valve member so that pivoting of the member from a closed to an open position as shown in FIG. 2 causes the spring to wind up. In this fashion, the pivoting to an open position of the clapper valve member 21 creates additional torque in the spring by partially coiling the spring whereby the spring further biases the valve to a closed position. The spring is designed to have a low constant so as to present substantially no obstruction to the passage of fluid through the orifice 20 when the valve is connected in a pressure system. The spring constant, however, is sufficient to normally maintain the clapper valve member 21 in a closed position with respect to the orifice 20.

The walls of the valve body 11 are provided with an inlet opening 50 leading into the chamber 12 and a discharge opening 51 leading from the chamber. Preferably the inlet and discharge openings are positioned 180° apart as shown in FIGS. 1 and 2. Both the openings are threaded to accommodate suitable connecting means, such as pipes, for a purpose to be described more fully hereinafter.

The outer top and bottom portions of the valve body 11 are concentrically grooved as at 52 and 53, respectively, to provide a grooved face to accommodate gaskets or other suitable sealing means when the test valve of the present invention is positioned in a pressure system below a pressure relief valve. It is further to be noted that the valve body 11 is of sufficient height that the clapper valve member 21 may completely pivot to an open position as shown in FIG. 2 without encountering any obstruction at the top of the chamber 12 of the valve 10. Moreover, it is important that the area of the orifice 20 be larger than the area of the orifice of the pressure relief valve to be tested. Preferably, the orifice 20 of the test valve is between 10 to 20 per cent larger than the orifice of the pressure relief valve with 15 per cent being a preferred differential.

Figure 3:
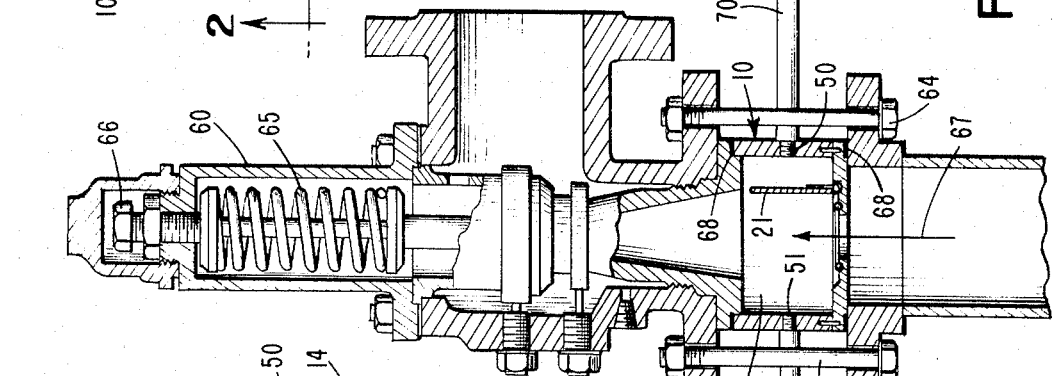
FIG. 3 is a side elevational view, partly in cross-section, showing a test valve according to the present invention mounted in position between the inlet flange of a pressure relief valve and a companion flange of a pressure system.

The test valve of the present invention just described is designed to be positioned below a pressure relief valve in a pressure system, as shown in FIG. 3. The pressure relief valve 60 is of a conventional type, having an orifice on the inside normally closed by a suitable valve member. The pressure relief valve 60 further is provided with an outwardly extending inlet flange 61 at its bottom. Normally, the inlet flange 61 is designed to be connected to a companion flange 62 on a pipe or other part 63 of a pressure system. In such a case, the inlet flange 61 would be connected to a companion pipe flange 62 by suitable means, such as bolts. The test valve of applicant's invention is specifically adapted to be positioned between the pressure relief valve inlet flange and a companion flange 62 from the pressure system, whereby it may be used with existing pressure relief valves.

As shown in FIG. 3, the test valve 10 of applicant's invention is positioned and mounted between the pressure relief valve inlet flange 61 and the companion flange 62 of a pressure system and secured in pressure tight relation by means of suitable bolts 64 extending through openings in both of the flanges. Suitable sealing means such as gaskets 68 may be provided at both the top and bottom of the test valve at grooved portions 52 and 53 to insure the desired pressure tight relationship between the parts of the device.

The pressure relief valve 60 with which applicant's test valve is intended to be used is of a conventional type in which the valve may be set to release at a predetermined pressure by an operator. One common type of pressure relief valve, such as that shown in FIG. 3, employs a spring 65 in the pressure relief valve whereby the compressive force of the spring may be adjusted to a predetermined pressure by suitable nut and bolt means 66.

In operation of the test valve of applicant's invention, the test valve 10 is first mounted in pressure tight relation between the inlet flange 61 of the pressure relief valve and a companion flange 62 of the pressure system. The pressure release valve is set to release at a predetermined pressure. After installation, the line pressure can be turned on in the pressure system whereupon the pressure flowing through the system in the direction of the arrow 67 shown in FIG. 3 will cause the spring loaded clapper valve member 21 to open to permit the pressure to flow through the orifice 20 into the chamber 12 and thereby equalize the pressure on either side of the clapper valve member 21. At the point the pressure is so equalized, the clapper valve member 21 will then close due to the torque of the spring means 44. The test valve is designed such that the clapper will then normally remain closed until the line pressure increases from 2 to 5 lbs. At this point the clapper valve member 21 will then open, permitting the pressure relief valve to unload any pressure exceeding its relief setting. When the pressure again equalizes, the clapper valve member 21 in the automatic test valve will again close automatically due to the torque of the spring means 44.

Testing of the pressure relief valve may be accomplished while pressure is still maintained in the pressure system. Initially, it is to be noted that both the inlet opening 50 and the discharge opening 51 feeding into and from the chamber 12 are normally closed by any suitable threaded plug member. When it is desired to test the pressure relief valve, the plug members are replaced by suitable pipe means in the openings. Thus, a connecting pipe 70 is attached to inlet opening 50, as shown in FIG. 3. Moreover, a quick opening valve 71 may be attached to the pipe member 70 and additionally connected to a supply of pressurized fluid which may be used to test the pressure relief valve. An additional pipe connecting means 72 may be threadably connected to the discharge opening 51 and provided with a quick opening valve 73 on its outer end.

To test the pressure relief valve 60, after the connecting pipes 70 and 72 and the associated valves have been connected thereto, valve member 71 is opened to allow fluid, such as gas, under pressure to enter into the chamber 12. The pressure of the entering pressurized test fluid will act on the top surface of the clapper valve member 20 to maintain it in closed position over the orifice 20. Thus, any upset in the line pressure is avoided. The pressure in the chamber is then increased to a desired level. Suitable pressure guage means may be connected to pipe means 70 and valve member 71 to measure the pressure in the chamber 12 and at which the pressure relief valve releases. If the pressure relief valve is functioning properly, it will release at the predetermined pressure.

Following completion of the test, or at any other time, the chamber 12 of the test valve may be purged of any fluid. This is particularly advantageous when corrosive type fluids may be present in the chamber 12 of the test valve 10. To purge the chamber 12, the quick opening valve 73 attached to the pipe 72 is opened, whereupon pressurized fluid entering through inlet opening 50 circulates within the chamber and subsequently discharges through discharge opening 51, pipe 72 and valve 73. It is important, of course, when purging the chamber 12 to keep the pressure of the fluid entering through inlet opening 50 below the pressure required to discharge the pressure relief valve 60.

It can be seen that the test valve and method of testing pressure relief valves of applicant's invention is highly advantageous. Since applicant's test valve is a separate valve member, it may be incorporated into pressure relief valves presently utilized in existing pressure systems. It is only necessary to select a test valve having an orifice larger than the orifice of the pressure relief valve, whereupon the test valve may be simply positioned and secured between the inlet flange of the pressure relief valve and the companion flange of the pressure system. The test valve functions automatically by virtue of the spring loaded clapper valve member to open and close. It therefore can continue to be used without any maintenance other than periodic checks. Moreover, the inlet opening and discharge opening of the test valve permit the inside of the test valve to be purged when the valve is used in connection with any type of corrosive substance.

Although the present invention has been illustrated and described with respect to a specific environment, it will be understood that various modifications may be made by persons skilled in the art without departing from the spirit of the invention which is defined solely by the appended claims.

I claim:

1. A test valve for testing a pressure relief valve having an inlet flange adapted for connection to a companion flange of a pressure system comprising
    a valve body adapted to be positioned in fluid tight relation between a pressure relief valve inlet flange and a companion flange of a pressure system,
    a chamber defined by said body,
    said body including a base member,
    an orifice defined by said base member,
    a pivotal clapper valve member normally closing said orifice,
    spring means biasing said clapper valve member to its normally closed position,
    said clapper valve member being adapted to automatically open and close in response to variations in pressure,
    an inlet opening in said body leading into said chamber to permit fluid under pressure to be introduced into said chamber, and
    a discharge opening in said body leading from said chamber to permit fluid to be discharged therefrom whereby said chamber may be purged without removing said valve from the pressure system.

2. A test valve according to claim 1 wherein said orifice is larger than the orifice of the pressure relief valve being tested.

3. A test valve according to claim 2 wherein said orifice is from 10 to 20 per cent larger than the orifice of the pressure relief valve being tested.

4. A test valve according to claim 1 wherein said body is cylindrical in configuration.

5. A test valve according to claim 1 wherein said base member includes a recessed area surrounding said orifice to receive said clapper valve member when in its closed position.

6. A test valve according to claim 1 wherein said clapper valve member is pivotally mounted on a pin secured to said base member.

7. A test valve according to claim 6 wherein said spring means comprises a torsion spring coiled around said pin.

8. A test valve according to claim 6 wherein said pin is mounted in an elongated slot in said base member.

9. A test valve according to claim 8 wherein said slot extends inwardly from one edge of said base member and which includes a plug inserted into said slot to close the end of said slot adjacent said one edge in pressure tight relationship.

10. A test valve for testing a pressure relief valve having an inlet flange adapted for connection to a companion flange of a pressure system comprising
   a cylindrical valve body adapted to be positioned in fluid tight relation between a pressure relief valve inlet flange and a companion flange of a pressure system,
   a chamber defined by said body,
   said body including a base member,
   an orifice defined by said base member,
   said orifice being larger than the orifice of the pressure relief valve being tested,
   a pivotal clapper valve member normally closing said orifice,
   spring means biasing said clapper valve member to its normally closed position,
   said clapper valve member being adapted to automatically open and close in response to variations in pressure,
   an inlet opening in said body leading into said chamber to permit fluid under pressure to be introduced into said chamber, and
   a discharge opening in said body leading from said chamber to permit fluid to be discharged therefrom whereby said chamber may be purged without removing said valve from the pressure system.

11. A pressure relief valve testing apparatus comprising
   a pressure relief valve having a valve housing with an inlet at one extremity thereof, said relief valve being adapted to open at a predetermined pressure,
   a pressure system normally connected to said relief valve, and
   a separate test valve having a valve body external to said pressure relief valve housing, mounted between said pressure system and said inlet extremity of said pressure relief vane housing, said test valve being adapted for automatically opening and closing in response to variations in pressure in said pressure system, said test valve also being adapted for selective connection to an external source of pressurized fluid for testing said relief valve such that both said pressure system and said external source may be in simultaneous communication with said pressure relief valve.

12. A pressure relief valve testing apparatus according to claim 11 wherein said separate test valve comprises a valve body having
   an open top portion adapted to mate with said inlet at said extremity of said pressure relief valve housing,
   a bottom portion adapted to mate with said pressure system, said bottom portion having an orifice and valving means adapted to open or close said orifice automatically in response to variations in pressure in said pressure system, and
   sidewall portions extending between said top portion and said bottom portion, said sidewall portions including an inlet opening which either may be closed or may be open and connected to said external source of pressurized fluid whereby, when so opened and connected, pressurized fluid from said external source may be introduced therethrough into said testing apparatus.

13. A pressure relief valve testing apparatus according to claim 12 wherein said separate test valve body sidewall portions further include a discharge opening which may be either open or closed whereby, when open, pressurized fluid introduced into said test valve body through said inlet opening may be discharged through said discharge opening to purge said testing apparatus.

* * * * *

UNITED STATES PATENT OFFICE
CERTIFICATE OF CORRECTION

Patent No. 3,768,299   Dated October 30, 1973

Inventor(s) Leeroy L. Garren

It is certified that error appears in the above-identified patent and that said Letters Patent are hereby corrected as shown below:

Claim 11, column 7, line 37 change "vane" to --valve--.

Signed and sealed this 12th day of March 1974.

(SEAL)
Attest:

EDWARD M. FLETCHER, JR.
Attesting Officer

C. MARSHALL DANN
Commissioner of Patents